Patented Mar. 1, 1932

1,847,247

UNITED STATES PATENT OFFICE

WILLIAM THOMAS JONES, OF PLEASANTVILLE, NEW YORK

MECHANICAL LAXATIVE

No Drawing.    Application filed February 14, 1931. Serial No. 515,894.

My invention relates to a mechanical laxative.

The laxative employed comprises the seeds of a plant which secretes an abundant supply of mucilaginous matter, and preferably mucilaginous matter which is substantially non-absorbable in the human system. The seeds of the plant Plantago-Psyllium, which grows in certain sub-tropical countries as the southern part of Europe and the northern part of Africa, is an example of the species. These seeds are known quite generally by the name Psyllium—dark brown, smooth and glossy seeds. In shape and size they are oblong—lanceolate and 1.5 to 2 m. m. long. Psyllium are practically devoid of taste. They are rich in mucilaginous matter and have the properties of smelling and increasing the bulk of the stool, and providing bran to stimulate peristalsis, the mucilaginous substance being a non-absorbable emollient which prevents irritation and serves as a lubricant for the passage of fecal matter. The laxative effect is wholly drugless and purely mechanical. Because of these characteristics and others which will be presently discussed, Psyllium seeds have become recognized by some of the highest authorities as in many respects superior to any other laxative agent.

The dosage ordinarily prescribed is from one to two heaping teaspoonsful of loose Psyllium at each meal. Because of their diminutive size and slippery nature, one almost invariably spills a portion of the seeds from the teaspoon on the tablecloth or plates, or both thereby producing a messy appearance. Frequently, the seeds adhere to the spoon and to one's lips. Moreover, it is inconvenient—and to some embarrassing—to use a sizable container for loose seeds of this character in public eating places. Accordingly, I have devised Psyllium seeds in a form which will overcome these inherent disadvantages.

I have found that if moisture is applied to Psyllium a secretion of glutinous or mucilaginous matter exudes from the external layer of the epidermis of the seeds. In a restricted sense I use this inherent characteristic of Psyllium as the basis of my invention.

When the moisture is permitted to evaporate a conglomerate mass of seeds—with the indurated mucilage serving as a binder—remains. If desired, a very slight quantity of an inert binder may be incorporated with the moisture to insure a more positive setting of the individual seeds. The ultimate form of the seeds en mass, as by methods hereinafter explained, is caused to assume any desirable shape in accordance with the dictates of the particular requirements. Then, if occasion should demand, the individual lumps may be coated with sugar, chocolate or the like.

In carrying out my invention in detail, I take a suitable quantity of Psyllium seeds and place them in a container designed for the purpose. A minimum quantity of moisture is then applied to the seeds by means of steam, a fine spray of water, etc. thus producing an exudation of mucilage. In this connection, it is of the utmost importance that the moisture applied be very slight—just sufficient to produce a slight excretion of mucilage the minimum proportion of water or moisture referred to may be approximately from 10 to 15 per cent. If the moisture is excessive, the exudation of mucilage will be too great, and aside from the fact that it is of the essence of my invention that the bulk of mucilage should remain within the testa of the seed, certain difficulties are subsequently encountered—the ultimate form of the product becomes somewhat distorted and extremely hard. So, upon the application of the minimum moisture it will be found that the seed are barely coated with mucilage. Then they are rapidly and thoroughly dried. And it will be observed that they are bound to each other in a homogeneous compact mass. If desired, the moist seeds may initially be spread out in a large pan, then dried and cut into smaller units. The moist seeds may be placed into individual molds; or, if preferred, the seeds may be first pulverized or reduced to some suitable comminutive form and then subjected to the moistening and desiccating process. Should the seeds be abnormally deficient in mucilage, or should it be found advantageous to maintain the original form and contents substantially intact the exudation of mucilage may be restricted to the very minimum by the incorporation of an inert binder as agar agar.

The final form, whether it be in the shape of a round tablet, a cube or a parallelepiped, may be enclosed in any sanitary wrapping, as paper or cellophane, and, if preferred, the lumps may be coated with sugar, chocolate or any other substance to render the combination tasty.

In its broader aspects my invention comprises not only the various means shown and described but equivalent means for performing the recited functions. It is desired to reserve the right to effect such changes and modifications as may fairly come within the scope of the appended claims. For example, the terms "water" and "moisture" are used in a generic sense, that is they include any substance, fluid or liquid which contains water or moisture and exhibits the stated and desired effect.

What I claim is:

1. As an article of manufacture, a substantially dry cake of seeds of the Psyllium type, held together by a mucilaginous binder obtained from seeds of the Psyllium type, the amount of binder being sufficient to form a frangible cake.

2. A substantially dry tablet containing Psyllium seeds held together by a mucilaginous binder extracted from the seeds, the amount of binder being just sufficient to form a frangible cake.

3. The method of tableting Psyllium seeds in a dry frangible state, which comprises moistening the seeds to cause exudation of a minimum amount of mucilaginous material therefrom, molding the moistened seeds, and drying the molded article.

Signed at New York, New York, this 13th day of February, 1931.

WILLIAM THOMAS JONES.